Byrne & Strunk,
Insect Destroyer.

No. 109,869. Patented Dec. 6, 1870.

Witnesses.
R. T. Campbell
J. A. Campbell

Inventors
Thos. Byrne
D. Strunk
by
Munn Fenwick & Lawrence

United States Patent Office.

THOMAS BYRNE, OF NEW YORK, N. Y., AND DEIDRICH STRUNK, OF LAVACA COUNTY, ASSIGNORS TO THEMSELVES AND J. J. SCHOTT, OF LAVACA COUNTY, TEXAS.

Letters Patent No. 109,869, dated December 6, 1870.

IMPROVEMENT IN INSECT-DESTROYERS.

The Schedule referred to in these Letters Patent and making part of the same.

*To all whom it may concern:*

Be it known that we, THOMAS BYRNE, of the city of New York, in the county and State of New York, and DEIDRICH STRUNK, of the county of Lavaca in the State of Texas, have invented a new and improved Device to Destroy Insects; and we do hereby declare that the following is a full, clear, and exact description thereof, reference being had to the accompanying drawing making part of this specification, in which—

Similar letters of reference indicate corresponding parts in both figures.

The nature of this invention consists in certain improvements in that class of devices known as insect destroyers, which will be hereafter fully described.

The object of these devices is to destroy winged insects which are destructive to the cotton plants and other vegetation, by combining a lamp and reflector with a vessel containing some suitable liquid, in such manner that at night the light will be reflected into the liquid, thereby operating to decoy as well as to destroy insects which may be in the neighborhood, as will be hereinafter explained.

To enable others skilled in the art to understand our invention, we will describe its construction and operation.

In the accompanying drawing—

A represents an open vessel, which is adapted for containing carbolic acid, coal-tar, or any other liquid which will destroy insects.

Within this vessel and centrally arranged is a lamp, B, which is secured fast to the bottom of the vessel, and constructed with a rim on its top for receiving and keeping in place a chimney, C.

Figure 1:
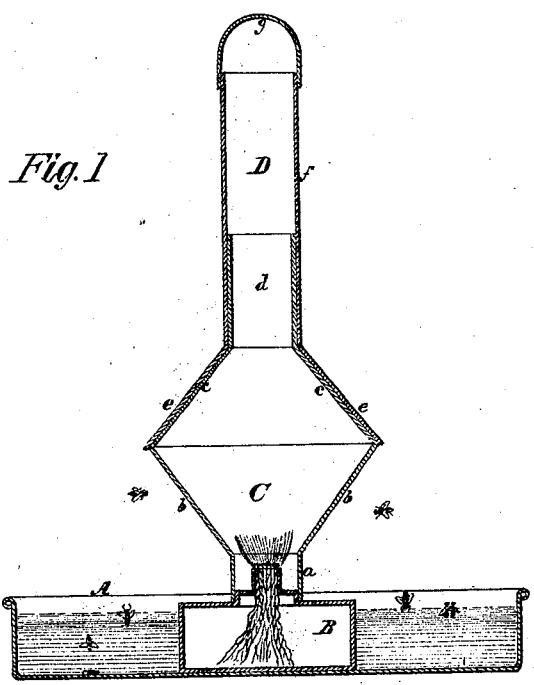
Figure 1 is a vertical central section through the device.
Figure 2:
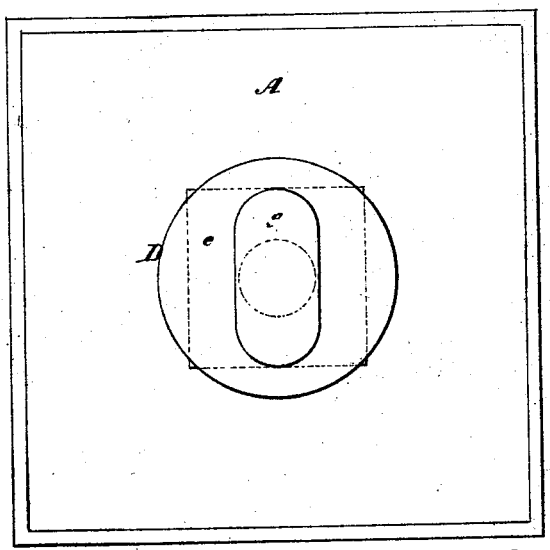
Figure 2 is a top view of the device.

The chimney, which is of glass or other transparent material, consists of a contracted tubular portion, $d$, a contracted base portion, $a$, and two conical portions, $b$ $c$, united at their bases, as shown in fig. 1.

Upon this chimney is a funnel-shaped chimney, D, consisting of a downwardly-flaring portion, $e$, a tubular portion, $f$, and a cap or hood, $g$.

This chimney D is made of metal or other suitable opaque substance, and the inner side of its base or flaring portion $e$ is plated or otherwise polished so as to afford a good reflecting surface which will not readily tarnish.

At night, after the lamp is lighted, the device is mounted upon a post or suspended from a bush in any conspicuous place, where it will be visible to surrounding insects.

All that portion of the device above the lower edge of the chimney D will be dark, and the rays of light will be reflected downwardly and outwardly into the liquid in the vessel A beneath, thus illuminating the liquid, and also that portion of the transparent chimney C which is below the lower edge of the opaque chimney D.

This portion $b$ of chimney C being illuminated, made of glass or other smooth substance and inclined, as shown in fig. 1, it operates to throw down into the liquid beneath the insects which fly against it.

Instead of securing the lamp to the pan A this lamp and its chimneys may be suspended above the pan or other suitable vessel containing liquid.

It is obvious that the portions $c$ and $d$ of the chimney C might be dispensed with in the manufacture of our insect-destroyer, by fitting the lower edge of the deflector directly to the upper edge of the deflecting portion C. We, however, prefer the plan shown as it is far more substantial and convenient.

What we claim as our invention, and desire to secure by Letters Patent, is—

The combination of the vessel A, lamp B, and chimney D, formed as shown, with the conical reflector $c$, and inverted conical transparent deflector $b$, placed base to base, when arranged as described, for the purpose specified.

THOMAS BYRNE.
DEIDRICH STRUNK.

Witnesses:
TH. OHMSTEDE.
JUSTUS I. SCHOTT.